(12) United States Patent
Yogo

(10) Patent No.: US 12,246,626 B2
(45) Date of Patent: *Mar. 11, 2025

(54) MOVEMENT ADJUSTMENT SYSTEM

(71) Applicant: TS TECH CO., LTD., Asaka (JP)

(72) Inventor: Hiroshi Yogo, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/542,856

(22) Filed: Dec. 18, 2023

(65) Prior Publication Data

US 2024/0116406 A1   Apr. 11, 2024

Related U.S. Application Data

(63) Continuation of application No. 17/826,227, filed on May 27, 2022, now Pat. No. 11,878,608, which is a
(Continued)

(30) Foreign Application Priority Data

Jun. 12, 2015   (JP) .................................. 2015-119598

(51) Int. Cl.
*B60N 2/06*   (2006.01)
*B60N 2/00*   (2006.01)
(Continued)

(52) U.S. Cl.
CPC ............. *B60N 2/206* (2013.01); *B60N 2/002* (2013.01); *B60N 2/01* (2013.01); *B60N 2/06* (2013.01);
(Continued)

(58) Field of Classification Search
CPC .......... B60N 2/206; B60N 2/90; B60N 2/995; B60N 2/79; B60N 2/002; B60N 2/01;
(Continued)

(56) References Cited

U.S. PATENT DOCUMENTS 3,982,787 A   9/1976   Moll
4,258,555 A   3/1981   Scharm et al.
(Continued)

FOREIGN PATENT DOCUMENTS

GB   2 455 295 A   6/2009
JP   S61-085232 A   4/1986
(Continued)

OTHER PUBLICATIONS

Office Action issued in related application JP 2019-118031, May 26, 2020, with machine generated English language translation, 9 pages.

*Primary Examiner* — Philip F Gabler
(74) *Attorney, Agent, or Firm* — Michael Best & Friedrich LLP

(57) ABSTRACT

In order to suppress a claustrophobic feeling that a person sitting on a rear seat receives due to a front seat, and to make the front seat easy to use as an ottoman by the person, a movement adjustment system is used for a passenger seat and a rear seat, and includes a slide rail for moving the rear seat in the front to back direction, and a control part for changing the movement region of the rear seat by the slide rail. The passenger seat has a seat cushion, and a seat back mounted to be changeable between an upright state and a lowered state with respect to the seat cushion. The control part changes the movement region so that the passenger seat and the rear seat can come closer when the seat back of the passenger seat is in the lowered state than in the upright state.

15 Claims, 13 Drawing Sheets

Related U.S. Application Data continuation of application No. 17/171,594, filed on Feb. 9, 2021, now Pat. No. 11,345,261, which is a continuation of application No. 16/537,673, filed on Aug. 12, 2019, now abandoned, which is a continuation of application No. 15/580,103, filed as application No. PCT/JP2016/067440 on Jun. 10, 2016, now Pat. No. 10,377,272.

(51) Int. Cl.

| | | |
|---|---|---|
| *B60N 2/01* | (2006.01) | |
| *B60N 2/07* | (2006.01) | |
| *B60N 2/20* | (2006.01) | |
| *B60N 2/32* | (2006.01) | |
| *B60N 2/56* | (2006.01) | |
| *B60N 2/75* | (2018.01) | |
| *B60N 2/90* | (2018.01) | |
| *B60N 3/00* | (2006.01) | |
| *B60N 3/06* | (2006.01) | |
| *B60R 22/26* | (2006.01) | |
| *B60N 2/02* | (2006.01) | |
| *B60R 22/18* | (2006.01) | |

(52) U.S. Cl.
CPC ............ *B60N 2/0727* (2013.01); *B60N 2/20* (2013.01); *B60N 2/32* (2013.01); *B60N 2/5657* (2013.01); *B60N 2/79* (2018.02); *B60N 2/90* (2018.02); *B60N 2/995* (2018.02); *B60N 3/002* (2013.01); *B60N 3/06* (2013.01); *B60R 22/26* (2013.01); *B60N 2002/022* (2013.01); *B60N 2/0268* (2023.08); *B60N 2/0272* (2023.08); *B60N 2210/24* (2023.08); *B60R 2022/1806* (2013.01); *B60R 2022/266* (2013.01)

(58) Field of Classification Search
CPC .......... B60N 2/06; B60N 2/0727; B60N 2/20; B60N 2/32; B60N 2/5657; B60N 3/06; B60N 2/0272; B60N 2/0268; B60N 2002/022; B60R 22/26; B60R 2022/1806; B60R 2022/266

See application file for complete search history.

(56) References Cited

U.S. PATENT DOCUMENTS

| | | |
|---|---|---|
| 5,385,382 A | 1/1995 | Single et al. |
| 5,605,368 A | 2/1997 | Noma et al. |
| 6,095,555 A | 8/2000 | Becker et al. |
| 6,457,765 B1 | 10/2002 | Bergquist et al. |
| 6,817,645 B2 | 11/2004 | Taguchi et al. |
| 6,827,394 B2 | 12/2004 | Watanabe et al. |
| 7,252,318 B2 | 8/2007 | Sumida et al. |
| 7,647,780 B2 | 1/2010 | Aoki et al. |
| 7,712,829 B2 | 5/2010 | Park |
| 8,096,616 B2 | 1/2012 | Ventura et al. |
| 8,888,189 B2 | 11/2014 | Tamura et al. |
| 9,643,521 B2 | 5/2017 | Frommann et al. |
| 9,896,002 B2 | 2/2018 | Zouzal et al. |
| 10,377,272 B2* | 8/2019 | Yogo ...................... B60N 2/995 |
| 10,479,241 B2 | 11/2019 | Filipkowski et al. |
| 11,345,261 B2* | 5/2022 | Yogo ...................... B60N 2/995 |
| 11,878,608 B2* | 1/2024 | Yogo ...................... B60N 2/20 |
| 2010/0181061 A1 | 7/2010 | Ozeki |
| 2011/0226461 A1 | 9/2011 | Fujii et al. |
| 2013/0038107 A1 | 2/2013 | Tamura et al. |
| 2015/0266404 A1 | 9/2015 | Sakane et al. |
| 2016/0288669 A1 | 10/2016 | Woodhouse et al. |
| 2017/0182913 A1 | 6/2017 | Uratsuji et al. |
| 2017/0341532 A1 | 11/2017 | Sowinski et al. |
| 2019/0047449 A1 | 2/2019 | Fujii et al. |
| 2019/0241043 A1 | 8/2019 | Ito et al. |
| 2019/0337429 A1 | 11/2019 | McElroy et al. |

FOREIGN PATENT DOCUMENTS

| | | |
|---|---|---|
| JP | S63-002759 A | 1/1988 |
| JP | H01-081960 U | 6/1989 |
| JP | 2009-073241 A | 4/2009 |
| JP | 2009-078671 A | 4/2009 |
| JP | 2014-111424 A | 6/2014 |
| WO | 2011/135651 A1 | 11/2011 |

\* cited by examiner

MOVEMENT ADJUSTMENT SYSTEM

CROSS REFERENCE TO RELATED APPLICATIONS

This application is a continuation of U.S. patent application Ser. No. 17/826,227, filed on May 27, 2022, which, in turn, is a continuation of U.S. patent application Ser. No. 17/171,594, filed on Feb. 9, 2021, now U.S. Pat. No. 11,345,261, which, in turn, is a continuation of U.S. patent application Ser. No. 16/537,673, filed Aug. 12, 2019, which is a continuation of U.S. patent application Ser. No. 15/580,103, filed Dec. 6, 2017, now U.S. Pat. No. 10,377,272, which is a National Stage Entry application of PCT Application No. PCT/JP2016/067440, filed Jun. 10, 2016, which claims the priority benefit of Japanese Patent Application No. JP 2015-119598, filed Jun. 12, 2015, the contents of all being incorporated herein by reference.

BACKGROUND

The present disclosure relates to a movement adjustment system and, more specifically, to a movement adjustment system capable of movably adjusting front and rear seats provided in a vehicle to a position where an in-vehicle space is suitably usable.

For a person who uses a vehicle, in addition to aesthetic characteristics and functionality, comfort of an in-vehicle environment is an important factor in selecting a vehicle. The comfort of the in-vehicle environment is significantly changed depending on the arrangement of seats provided in the vehicle. For example, as shown in Japanese Patent Publication JP 2009-73241 A, in a vehicle having front and rear seats, comfort is increased by adjusting a clearance between the front and rear seats and using the front seat as a footrest (an ottoman) for a sitting person.

Moreover, when putting a child of an early age in a vehicle, a child seat is generally used. As shown in FIG. 12, an adult, Ha, may, after putting a child, Hb, in a child seat or the like mounted to a right rear seat 3, in order to hold the child Hb, attach a tong of a seat belt (not shown) to a belt buckle 20 while still being outside of a vehicle C1a. The reason is because it may be difficult to find the buckle from the inside of the vehicle C1a depending on the arrangement of the child seat or a chair.

In the technique of Japanese Patent Publication JP 2009-73241 A, between when a seat back of the front seat is in an upright state and when it is in a lowered state, an adjustable clearance range between the front seat and the rear seat is not changed. Therefore, in a state that the seat back of the front seat is raised up, that is, in a state that it cannot be used as an ottoman, the front seat and the rear seat come too close, so that a person sitting on the rear seat sometimes feels a claustrophobic feeling by a narrowed field of view due to the front seat.

Moreover, as shown in FIG. 12, in a state of being outside of the vehicle C1a, the adult Ha's action of putting the child Hb in the right rear seat 3 on which the child seat is present, and subsequently inserting the tongue of the seat belt (not shown) in the belt buckle 20, is sometimes unpleasant during rainfall, or in case of under a hot sun or in coldness, and the like.

Moreover, as shown in FIG. 13, in a case where, as a table T1 for the person sitting on the right rear seat, the table T1 rotatably mounted to a seat back 1b of a driver seat 1 is used, the table T1 is sometimes difficult to use because it is separated too far therefrom when the person sitting on the rear seat leans on a seat back of the rear seat. The reasons are that the table 1 is limited in projection length since it is mounted to the seat back of the driver seat 1, and that the clearance between the driver seat 1 and the right rear seat 3 is at least a predetermined length to secure a suitable space where the person sitting on the right rear seat 3 can put his feet (e.g., suitable legroom).

SUMMARY

The present disclosure has been made in view of the above problems, and an embodiment suppresses a claustrophobic feeling that a person sitting on a rear seat receives from a front seat, and to make the front seat easy to use as an ottoman for an occupant of the rear seat. Moreover, an embodiment facilitates insertion of a tongue of a seat belt into a belt buckle of the rear seat from the vehicle interior side. Moreover, an embodiment includes a table mounted to the seat configured to project to the near side of the occupant of the rear seat.

According to an embodiment of a movement adjustment system of the present disclosure, the movement adjustment system used for conveyance seats including a front seat and a rear seat, includes a moving mechanism configured to move at least one of the front seat and the rear seat in a front to back direction, and a movement region change part configured to change a movement region of the at least one of the front seat and the rear seat moved by the moving mechanism, in which the front seat has a seat cushion, and a seat back mounted to be changeable between an upright state and a lowered state with respect to the seat cushion, and the movement region change part changes the movement region so that the front seat and the rear seat can come closer when the seat back of the front seat is in the lowered state than when the seat back of the front seat is in the upright state.

According to the above configuration, the movement region change part changes the movement region of at least one of the front seat and the rear seat so that the front seat and the rear seat can come closer when the seat back of the front seat is in the lowered state than when the seat back of the front seat is in the upright state, thereby the front seat can be made easy to use as an ottoman of the rear seat. That is, when the front seat is in the upright state, the claustrophobic feeling that a person sitting on the rear seat receives from the front seat can be suppressed by separating the rear seat therefrom by a fixed distance. Then, in a case where, when the front seat is in the lowered state, the claustrophobic feeling is not received because the field of view is not obstructed by the front seat, the front seat can be made easy to use as an ottoman by allowing the front seat and the rear seat to come closer.

Moreover, preferably, the clearance between the front seat and the rear seat includes a first clearance in which an occupant of the rear seat can put his feet through between the front seat and the rear seat, and a second clearance in which the occupant cannot put his feet through between the front seat and the rear seat, and, only when the seat back of the front seat is in the lowered state, the movement region change part set the movement region to a range in which the clearance between the front seat and the rear seat is the first clearance and a range in which the clearance between the front seat and the rear seat is the second clearance. According to the above configuration, the movement region change part set to the movement region the region including the range becoming the clearance not capable of putting the feet therethrough only when the seat back is lowered, thereby the front seat and the rear seat can come closer. Therefore, the feet, for example, the neighborhood of the Achilles' tendons of the sitting person on the rear seat is easy to be put on the more front side of the front seat, and the front seat can be more comfortably used as an ottoman. In particular, when the front seat is not in the lowered state and in the upright state not capable of using as an ottoman, the clearance between the front seat and the rear seat is not the second clearance, thereby a space through which the feet are put between the front seat and the rear seat can be secured.

Further, preferably, when the front seat and the rear seat are in the positions close to each other, the moving mechanism moves the front seat or the rear seat so that the relative position of the rear seat to the front seat is higher than when the front seat and the rear seat are in the positions separated from one another. According to the above configuration, when the front seat and the rear seat are in the positions close to each other, the relative position of the rear seat to the front seat is configured to be higher, thereby posture is suppressed from being cramped when the feet of the sitting person on the rear seat are put on the front seat, and the front seat is easy to use as an ottoman. In particular, since the front seat is higher than the height of the seat cushion of the rear seat by the height of the folded seat back thereof, posture is likely to be clamped in a case where the sitting person on the rear seat puts his feet on the front seat, and increasing the height of the rear seat is significant in order to suppress the clamped posture.

Moreover, preferably, a detection part for detecting the lowered state and the upright state of the seat back of the front seat is included, and the movement region change part determines the lowered state and the upright state of the seat back based on the signal obtained from the detection part, and, when the seat back is in the lowered state, changes the movement region so that the front seat and the rear seat can be moved to the positions close to each other than when it is in the upright state. According to the above configuration, the movement adjustment system includes the detection part, thereby the lowered state and the upright state of the front seat can be electrically detected, and electrical control for changing the movement region is possible.

Moreover, preferably, another detection part for detecting the presence of a sitting person on the front seat is included, and the movement region change part determines the presence and the absence of the sitting person on the front seat based on the signal obtained from the other detection part, and, when the sitting person is absent, changes the movement region so that the front seat and the rear seat can be moved to the positions close to each other than when the sitting person exists. According to the above configuration, by including the other detection part, only if the sitting person does not exist on the front seat, it is possible to change the movement region so that the front seat and the rear seat can come close to each other.

Further, preferably, the front seat and the rear seat are composed of a plurality of rows, and, of the front seat or the rear seat in one row, to one whose movement region is changed by the movement region change part, a table projecting in front of the rear seat in another row adjacent to the one row is mounted. According to the above configuration, the table projecting to the other row side is mounted to the front seat or the rear seat whose movement region is changed, thereby the table can be projected in front of the rear seat in the other row by using the positional deviation between one of the front seat or the rear seat in one row and the rear seat in the other row. Therefore, the table is arranged in a position capable of suitably using by a sitting person on the seat in the other row.

Moreover, preferably, the front seat and the rear seat are composed of a plurality of rows, and, of the front seat or the rear seat in one row, one whose movement region is changed by the movement region change part has another seat cushion, and another seat back mounted to the other seat cushion, and the other seat back is mounted to the other seat cushion to be rotatable to the other row side. According to the above configuration, the other seat back of the front seat or the rear seat whose movement region is changed is mounted to the other seat cushion to be rotatable to the other row side, thereby it is possible to easily take care of one sitting person between one row and the other row by using the rotation of the front seat or the rear seat in one row and the positional deviation with the rear seat in the other row.

Moreover, preferably, the front seat and the rear seat are composed of a plurality of rows, and, of the front seat or the rear seat in one row, one whose movement region is changed by the movement region change part has another seat cushion, and another seat back mounted to the other seat cushion, the other seat back has edge portions bulging forward on both sides of the seat width direction, and the other row side in the edge portion is formed to be compressively deformable than the counter side of the other row side. According to the above configuration, the other row side in the edge portion provided at the other seat back of one, whose movement region is changed, of the front seat or the rear seat in one row is formed to be compressively deformable than the counter side of the other row side, thereby it is possible to easily take care of the sitting person sitting on the rear seat on the other row side by using the compression of the other seat back, and the positional deviation between one of the front seat and the rear seat in one row and the rear seat in the other row.

Moreover, preferably, the front seat and the rear seat are composed of a plurality of rows, the movement region change part changes the movement region of at least one of the front seat and the rear seat in one row so that the front seat and the rear seat can come closer when the seat back of the front seat is in the lowered state than in the upright state, a supply opening of an air-conditioner is arranged on the other row side of at least one of the front seat and the rear seat in the one row, and air flow is provided obliquely backward from the supply opening toward the rear seat in the other row. According to the above configuration, of the seats consisting of the front seat and the rear seat in a plurality of rows, the supply opening of the air-conditioner is arranged in at least one, whose movement region is changed, of the front seat and the rear seat in one row, thereby it is possible to facilitate supplying warm air or cool air to the sitting person on the rear seat in the other row.

Further, preferably, the front seat and the rear seat are composed of a plurality of rows, the movement region change part changes the movement region of the rear seat in one row so that the front seat and the rear seat can come closer when the seat back of the front seat is in the lowered state than in the upright state, the rear seat in the other row adjacent to the one row includes a belt buckle into which a tongue of a seat belt is inserted, and the rear seat in the one row is changed in the movement region by the movement region change part to be movable to the front side in the front to back direction than the belt buckle of the rear seat in the other row when the seat back of the front seat is in the lowered state. According to the above configuration, the rear seat in one row is movable to the front side in the front to back direction than the rear seat in the other row, thereby a person gets into the vehicle from behind the rear seat in one row, and insertion of the tongue of the seat belt into the belt buckle of the rear seat in the other row is facilitated. In particular, since insertion of the tongue of the seat belt into the belt buckle is possible not from the outside of the vehicle but from the seat side in one row in the inside of the vehicle, it is possible to easily perform an attachment work of a child seat, for example, without wetting a person in rainy weather.

According to the movement adjustment system of the present disclosure, the front seat can be made easy to use as an ottoman of the rear seat. According to the movement adjustment system of the present disclosure, the front seat can be more comfortably used as an ottoman by allowing the front seat and the rear seat to come closer when the seat back is fallen down. According to the movement adjustment system of the present disclosure, posture is suppressed from being cramped, and the front seat is easy to use as an ottoman. According to the movement adjustment system of the present disclosure, by including the detection part, the lowered state and the upright state of the front seat can be electrically detected, and electrical control for changing the movement region is possible. According to the movement adjustment system of the present disclosure, by including the other detection part, only if the sitting person does not exist on the front seat, it is possible to change the movement region so that the front seat and the rear seat can come close to each other. According to the movement adjustment system of the present disclosure, by using the positional deviation between one of the front seat or the rear seat in one row and the rear seat in the other row, it is possible to arrange the table capable of being suitably used by a sitting person on the seat in the other row. According to the movement adjustment system of the present disclosure, by using the rotation of the rear seat in one row and the positional deviation with the rear seat in the other row, it is possible to easily take care of a sitting person on the rear seat on the other row side. According to the movement adjustment system of the present disclosure, it is possible to facilitate supplying warm air or cool air to the sitting person on the rear seat in the other row. According to the movement adjustment system of the present disclosure, a person gets into the vehicle from behind the rear seat in one row, and insertion of the tongue of the seat belt into the belt buckle of the rear seat in the other row is facilitated.

BRIEF DESCRIPTION OF DRAWINGS

Various embodiments of the invention are illustrated in the drawings, in which.

DETAILED DESCRIPTION

Hereinafter, a movement adjustment system according to embodiments of the present disclosure is described with reference to the drawings. In particular, the movement adjustment system according to the present embodiments is configured to adjust the clearance of seats in two rows, front and rear, provided in a vehicle. It should be noted that the embodiments described below are merely examples to facilitate understanding of the present disclosure, and the present disclosure is not limited thereto. That is, the shape, dimension, arrangement and the like of the members described below can be changed and improved without departing from the gist of the present disclosure, and as a matter of course, the present disclosure includes equivalents thereof.

First Embodiment

Figure 1:
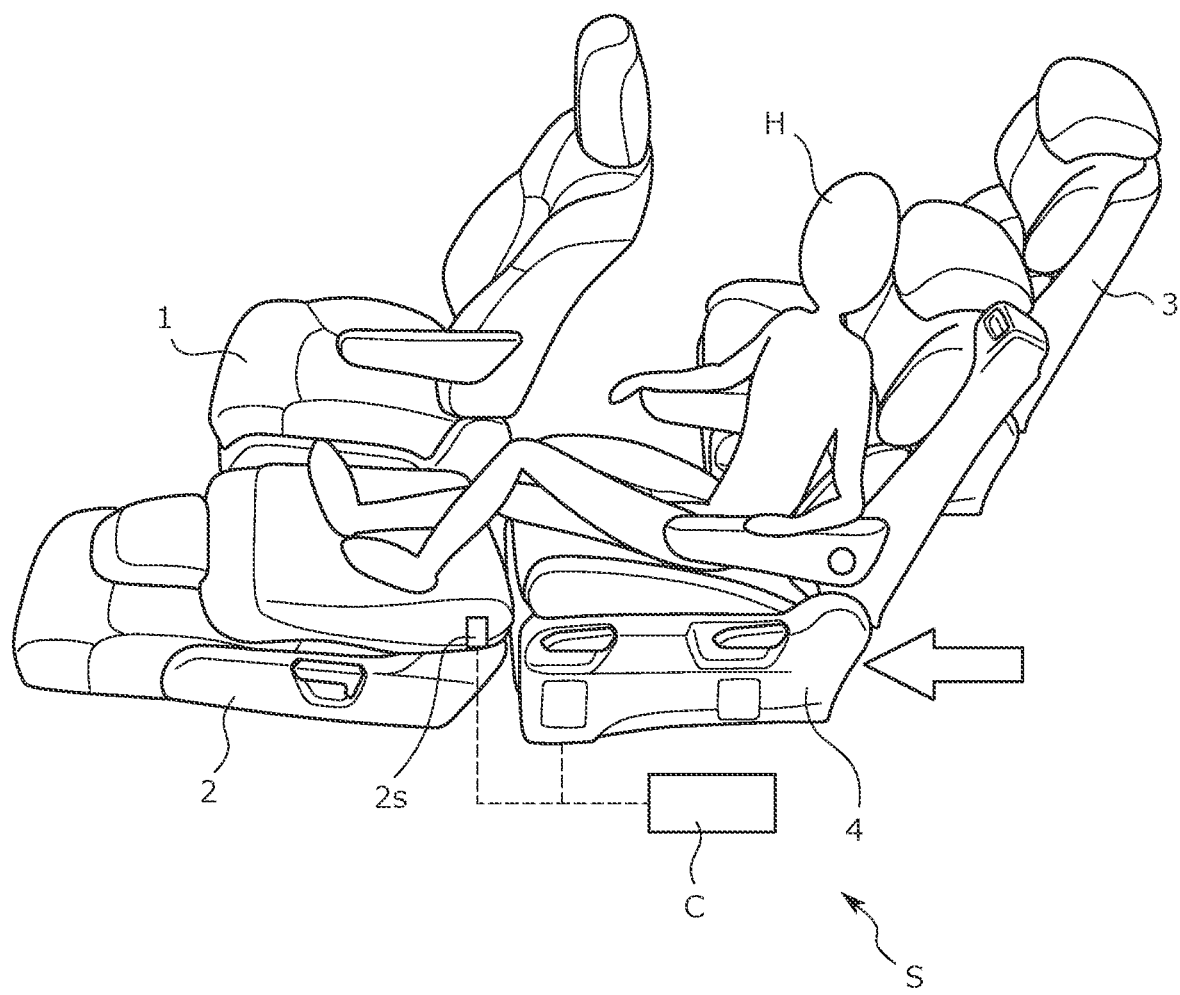
FIG. 1 is a perspective view showing a state of the interior of a vehicle including a movement adjustment system according to embodiments of the present disclosure.
Figure 2A:
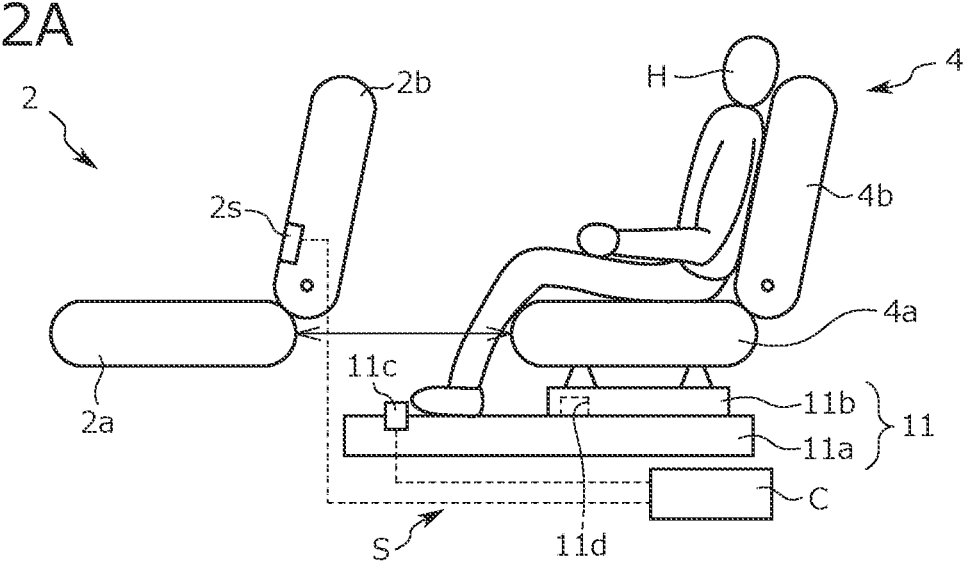
FIG. 2A is a side, schematic diagram showing a normal state of the movement adjustment system according to a first embodiment of the present disclosure.
Figure 2B:
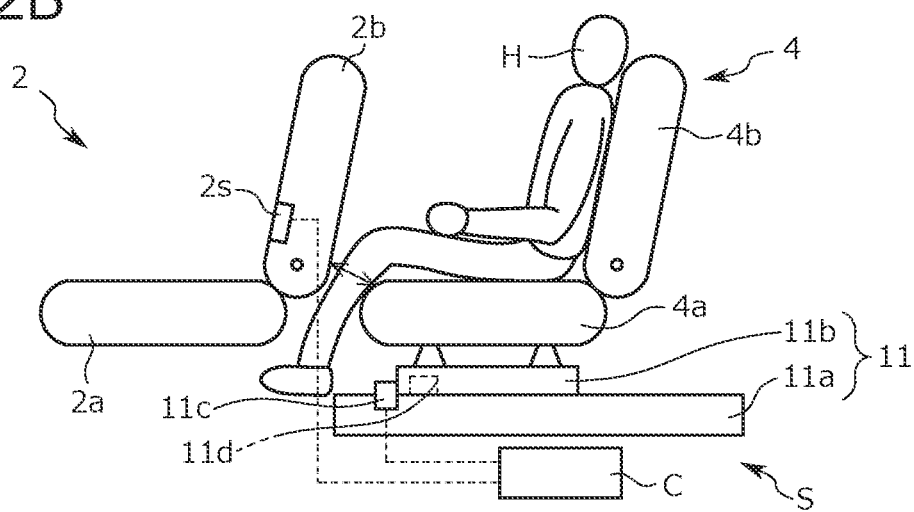
FIG. 2B is a side, schematic diagram showing a state that a left rear seat is brought close to a passenger seat in a state that a seat back of the passenger seat is raised up.
Figure 2C:
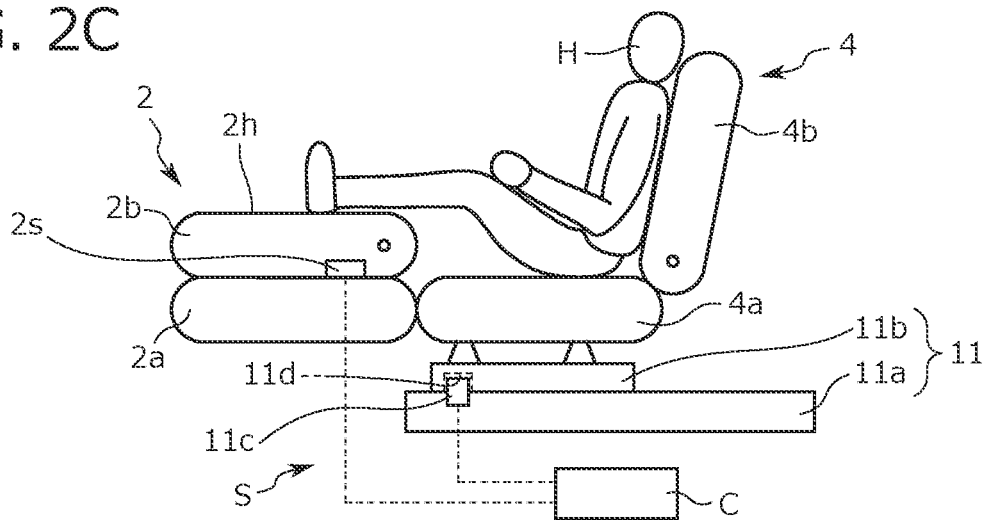
FIG. 2C is a side, schematic diagram showing a state that the left rear seat is brought close to the passenger seat in a state that the seat back of the passenger seat is lowered, and is a view showing a state that a sitting person uses the passenger seat as an ottoman.
Figure 3:
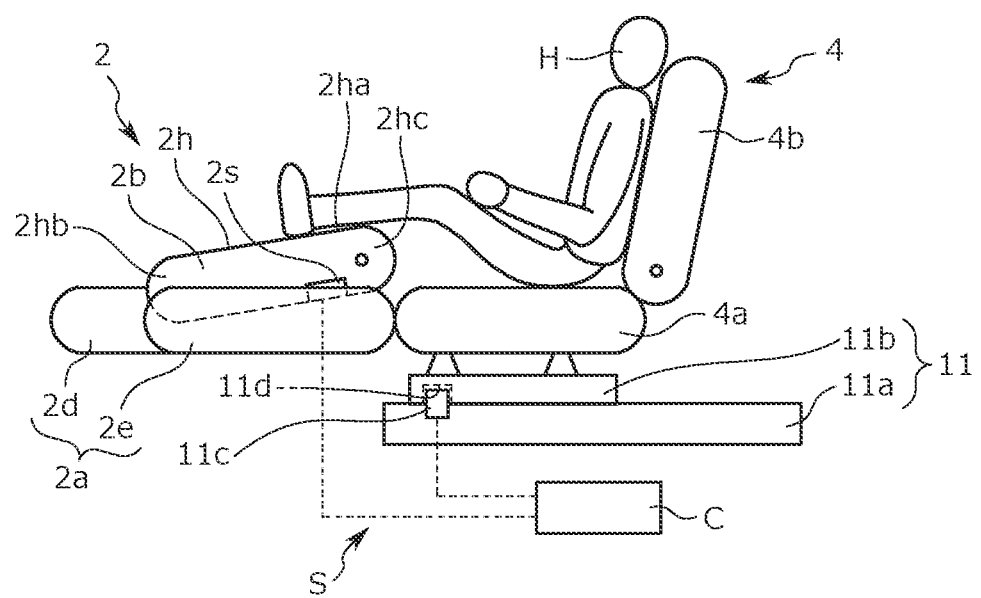
FIG. 3 is a side, schematic diagram showing a state that the seat back of the passenger seat is sunk into a seat cushion, and is a view showing the state that the sitting person uses the passenger seat as the ottoman.

With reference to FIG. 1 to FIG. 3, a movement adjustment system S, according to a first embodiment, configured to adjust a seat position by electric control is described.

Here, FIG. 1 is a perspective view showing a state of the interior of a vehicle Ca including the movement adjustment system S according to embodiments of the present disclosure. Moreover, FIG. 2A is a side, schematic diagram showing a normal state of the movement adjustment system S according to the first embodiment of the present disclosure, FIG. 2B is a side, schematic diagram showing a state that a left rear seat 4 is brought close to a passenger seat 2 in a state that a seat back 2b of the passenger seat 2 is raised up, and FIG. 2C is a side, schematic diagram showing a state that the left rear seat 4 is brought close to the passenger seat 2 in a state that the seat back 2b of the passenger seat 2 is lowered, and is a view showing a state that a sitting person H uses the passenger seat 2 as an ottoman. Further, FIG. 3 is a side, schematic diagram showing a state that the seat back 2b of the passenger seat 2 is sunk into a seat cushion 2a, and is a view showing the state that the sitting person H uses the passenger seat 2 as the ottoman.

As shown in FIG. 1, the vehicle Ca according to the present embodiment is configured to include a conveyance seat having a driver seat 1, a passenger seat 2, a right rear seat 3 and left rear seat 4, and the movement adjustment system S. In the present embodiment, the row of the driver seat 1 and the right rear seat 3 and the row of the passenger seat 2 and the left rear seat 4 are adjacent rows. Needless to say, the present disclosure is further applicable to a conveyance including seats composed of a plurality of rows.

The passenger seat 2 corresponds to a front seat according to the present disclosure, and mainly includes a seat cushion 2a, and a seat cushion 2b mounted to and configured to be raised up and lowered relative to the seat cushion 2a. In the seat back 2b, on a surface facing the seat cushion 2a when lowered (e.g., in a "fall-down" state or configuration), a fall-down sensor 2s (described below) is mounted. It should be noted that, as described below, the passenger seat 2 is usable as a footrest for the sitting person H (also called an occupant) sitting on the left rear seat 4. Therefore, a skin having a high water repellency and easy stain resistance (e.g., a skin used for a seat for a two-wheeled vehicle in terms of cleaning properties) is mounted to the seat back 2b of the passenger seat 2, at a position of at least the footrest.

The left rear seat 4 corresponds to a rear seat according to the present disclosure, and mainly includes a seat cushion 4a, and a seat back 4b mounted to a rear end of the seat cushion 4a. The seat cushion 4a is mounted on a slide rail 11 described below, and therefore the left rear seat 4 is configured to be movable back and forth.

As shown in FIG. 2, the movement adjustment system S includes the slide rail 11 as a moving mechanism, a lock member 11c mounted to a lower rail 11a of the slide rail 11, the fall-down sensor 2s, and a control part C for controlling the lock member 11c.

The slide rail 11 includes the lower rail 11a fixed to a floor (not shown) of the vehicle Ca and extending in the front to back direction, and an upper rail 11b mounted to be slidable back and forth with respect to the lower rail 11a.

The lock member 11c corresponds to one of a movement region change part according to the present disclosure, includes a solenoid which, for example, operates electrically and linearly, and, on the front side of the lower rail 11a, is mounted to a position capable of interfering with the upper rail 11b when protruded.

The fall-down sensor 2s is a detection part according to the present disclosure and includes a proximity sensor of induction type, capacitance type, magnetic type or the like, and is mounted to the seat back 2b of the passenger seat 2. The fall-down sensor 2 is configured to detect whether the seat back 2b is lowered (e.g., in the fall-down configuration) and is close to the seat cushion 2a or raised up and to transmit a detection signal to the control part C.

The control part C corresponds to one of the movement region change part according to the present disclosure, and is configured to control a limit of the forward movement of the left rear seat 4 by protruding the lock member 11c from the lower rail 11a when it is in the state shown in FIG. 2A and FIG. 2B. On the other hand, when the seat back 2b is in a lowered state, the control part C controls the lock member 11c to permit the forward movement of the left rear seat 4 by pulling the lock member 11c into the lower rail 11a. The control part C determines these states, that is, whether the seat back 2b is in an upright state or in the lowered state based on the detection signal received from the fall-down sensor 2s.

Specifically, when the seat back 2b is in the upright state shown in FIG. 2A and FIG. 2B, the lock member 11c is controlled by the control part C to protrude from the lower rail 11a, and therefore abuts the upper rail 11b. Therefore, the left rear seat 4 can come close to or be separated from the passenger seat 2 in a range to keep the clearance (also called a first clearance) through which the sitting person H can put his feet (e.g., legroom) by abutment of the lock member 11c to the upper rail 11b. On the other hand, when the seat back 2b is in the lowered state shown in FIG. 2C, the lock member 11c is controlled by the control part C to move into the lower rail 11a, and therefore does not abut the upper rail 11b. Therefore, the left rear seat 4 can come close to the passenger seat 2 until it reaches a clearance (also called a second clearance) into which the sitting person H cannot put his feet, that is, the position where the passenger seat 2 and the left rear seat 4 abut each other in the present embodiment. In other words, when the upright state is changed to the lowered state, the movement region of the left rear seat 4 is expanded to include the range that includes the second clearance in addition to the range that includes the first clearance. It should be noted that the state shown in FIG. 2C and FIG. 3 is a state that the lock member 11c is pulled in the lower rail 11a and the left rear seat 4 is moved forwardly, and thereafter the lock member 11c protrudes and engages with a lock groove 11d by the control of the control part C.

In an embodiment, the seat cushion 2a is configured as shown in FIG. 3. Specifically, the seat cushion 2a includes a cushion part 2d, and side frames 2e formed back and forth on both sides of the seat width direction of the cushion part 2d. Then, the cushion part 2d is configured to be slidable forwardly with respect to the side frames 2e, and the cushion part 2d becomes in a forwardly slid state, thereby the seat back 2b is configured to be capable of sinking downward. By such a configuration, when the seat back 2b is in the lowered state, it is possible to relatively lower the upper surface position of the seat back 2b. Therefore, the sitting person H can put the neighborhood of the back side of the Achilles' tendons of his feet on the seat back 2b, and it allows the sitting posture to be a comfortable posture which hardly gives a burden to his body.

It should be noted that the configuration to thus ease the sitting posture is not limited to deforming the seat cushion 2a side of the passenger seat 2. For example, the slide rail 11 of the left rear seat 4 may be formed obliquely so that the relative position of the left rear seat 4 to the passenger seat 2 is higher, that is, so that the left rear seat 4 is movable obliquely forward.

In addition, the sensor to detect the lowered state of the seat back 2b is not limited to the fall-down sensor 2s including a proximity sensor, and may be a sensor to detect inclination of the seat back 2b, and other sensors may be used to detect the lowered state.

Further, depending on the magnitude of the current load of a motor (not shown) for sliding the passenger seat 2 or the left rear seat 4, the control part C may limit the sliding by stopping the operation of the motor (not shown) if it is determined that the feet of the sitting person H are sandwiched.

Moreover, in a case where a foldable mechanism configured to fold the seat back 2b of the passenger seat 2b from the left rear seat 4 side is included, a sensor to detect the sitting person H not to allow the foldable mechanism to be operated when the sitting person H is on the passenger seat 2 may be provided.

Associated Configuration

Figure 4:
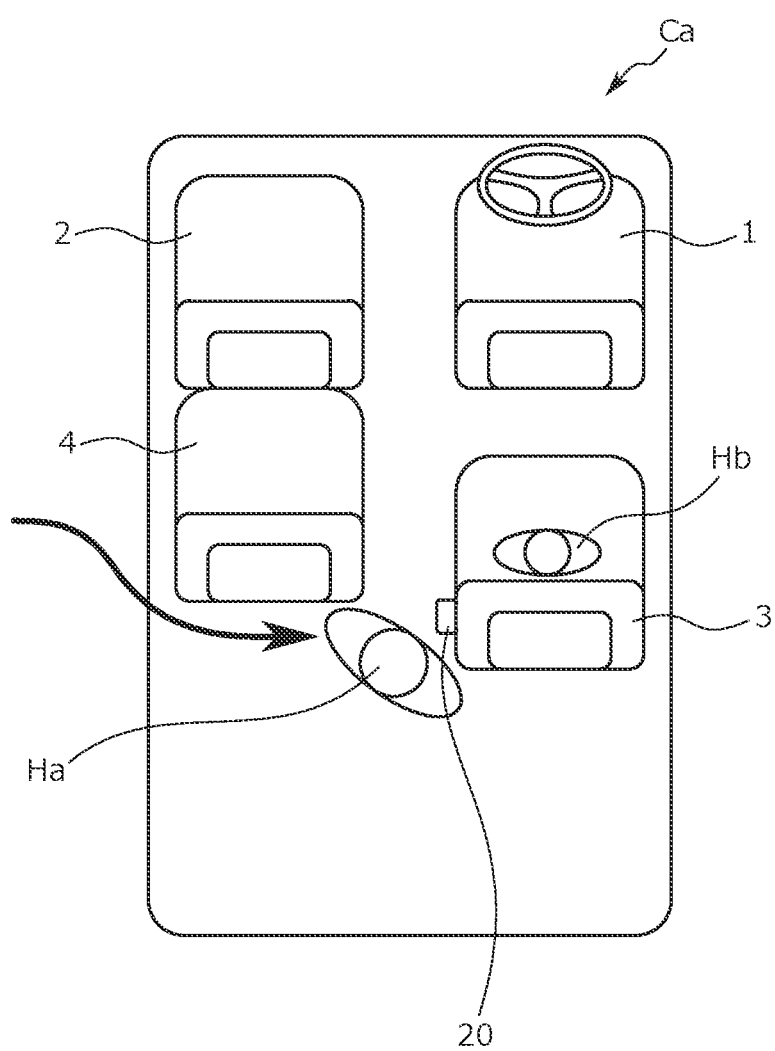
FIG. 4 is a top, schematic diagram showing a state that the left rear seat is moved towards the passenger seat side until a belt buckle mounted to a right rear seat is suitably exposed.
Figure 5:
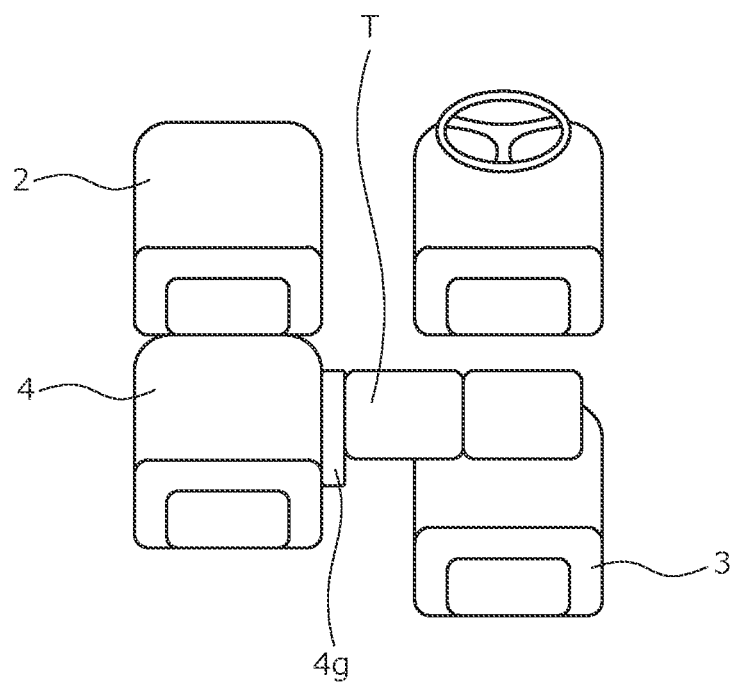
FIG. 5 is a top, schematic diagram showing a state that a table for the right rear seat projects from an armrest of the left rear seat.
Figure 6:
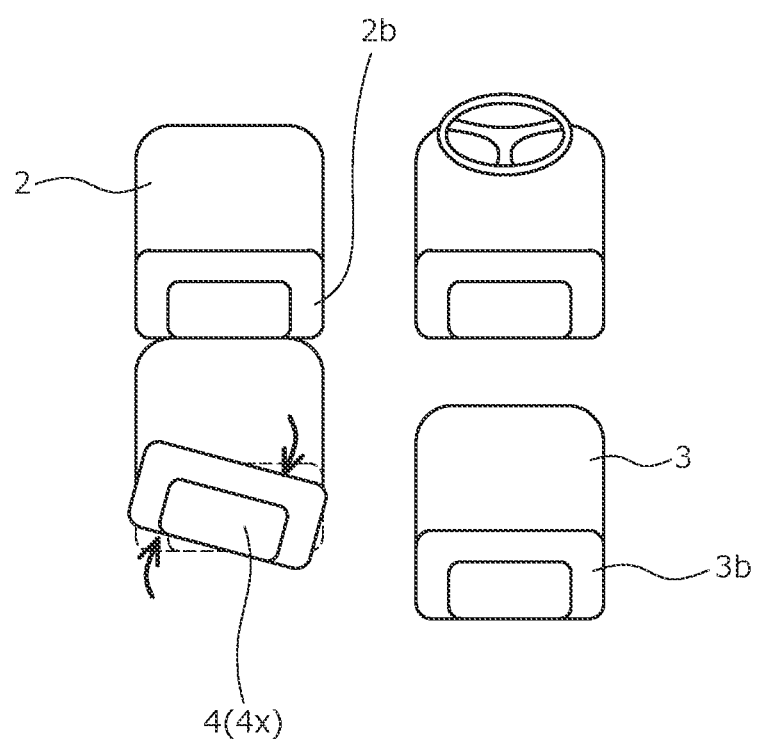
FIG. 6 is a top, schematic diagram showing an example in which a seat back of the left rear seat is configured to be rotatable.
Figure 7:
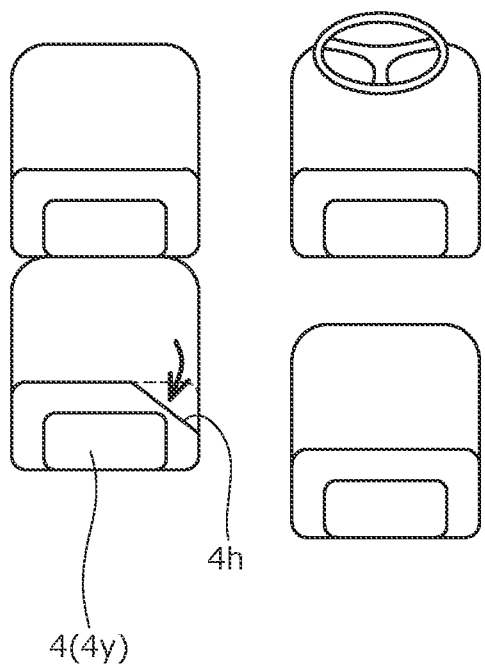
FIG. 7 is a top, schematic diagram showing a state that an edge portion of the seat back of the left rear seat is compressed.
Figure 8:
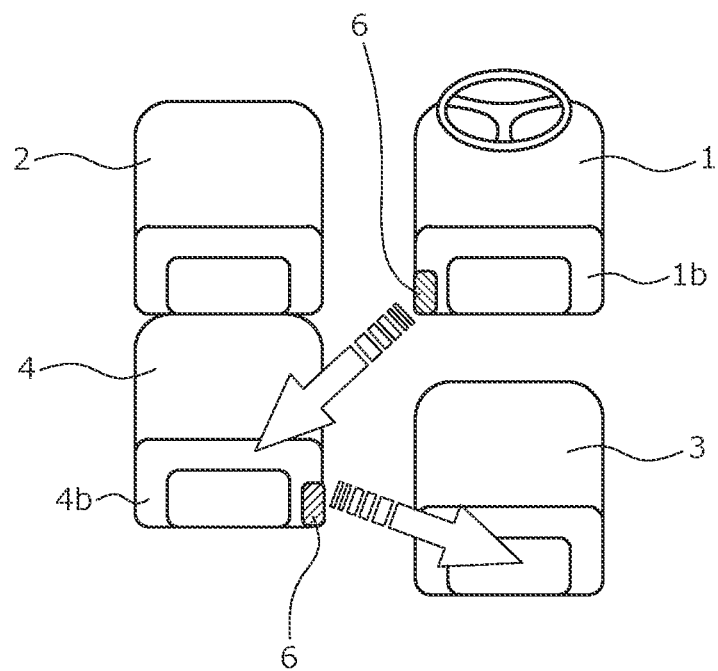
FIG. 8 is a top, schematic diagram showing a configuration in which supply openings of an air-conditioner are provided in seat backs of a driver seat and the left rear seat.

With reference to FIG. 4 to FIG. 8, the configuration associated with the movement adjustment system S is described. Here, FIG. 4 is a top, schematic diagram showing a state that the left rear seat 4 is moved towards the passenger seat 2 side until a belt buckle 20 mounted to the right rear seat 3 is suitably exposed, FIG. 5 is a top, schematic diagram showing a state that the table T for the right rear seat 3 projects from an armrest 4g of the left rear seat 4, FIG. 6 is a top, schematic diagram showing an example in which a seat back 4x of the left rear seat 4 is configured to be rotatable, FIG. 7 is a top, schematic diagram showing a state that an edge portion 4h of a seat back 4y of the left rear seat 4 is compressed, and FIG. 8 is a top, schematic diagram showing a configuration in which supply openings 6 of an air-conditioner are provided in the shoulders of the seat backs 1b, 4b of the driver seat 1 and the left rear seat 4.

As shown in FIG. 4, the left rear seat 4 is configured to be movable to the passenger seat 2 side further than the belt buckle 20 so that the belt buckle 20 mounted to the right rear seat 3 is exposed over a wider range. By such a configuration, after putting the child Hb in the right rear seat 3 from the outside of the right rear seat 3, the adult Ha gets into the vehicle from behind the left rear seat 4 in a state that the left rear seat 4 is arranged on the front side (the passenger seat 2 side), thereby it is possible to easily fasten a tongue of a seat belt (not shown) to the belt buckle 20.

Figure 12:
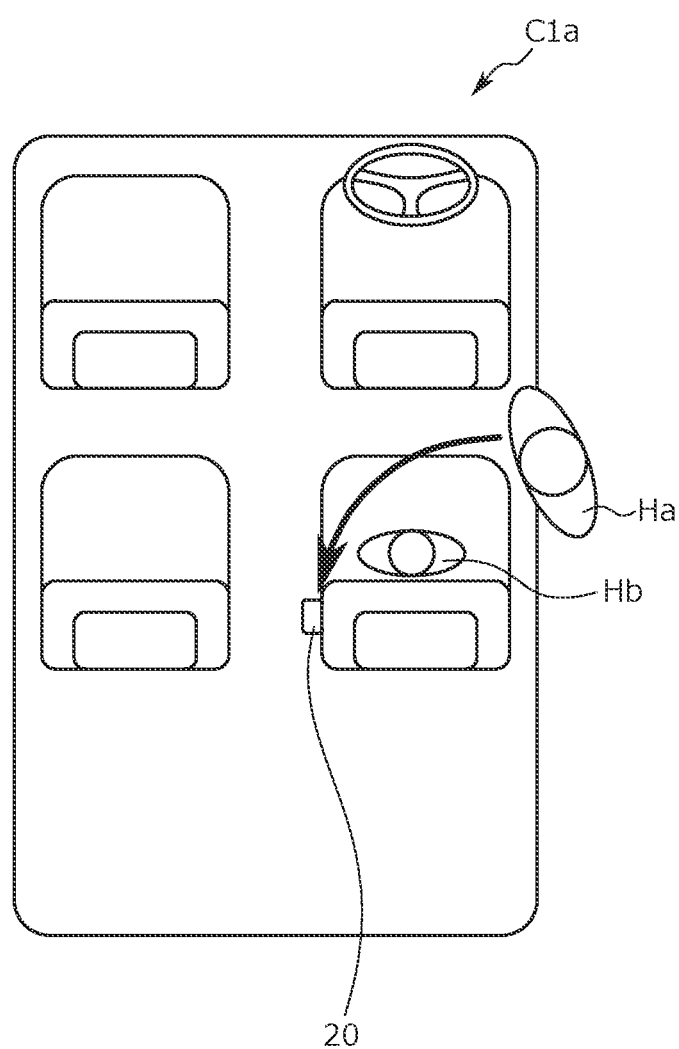
FIG. 12 is a top, schematic diagram showing a positional relationship when an adult puts a child in a vehicle.

Therefore, in rainy weather and the like as shown in FIG. 12 and mentioned above, since the adult Ha inserts the tongue of the seat belt (not shown) in the belt buckle 20 after putting the child Hb in the right rear seat 3 on which a child seat is present, it is not necessary for the adult Ha to remain in the outside of the vehicle in the rain.

Figure 13:
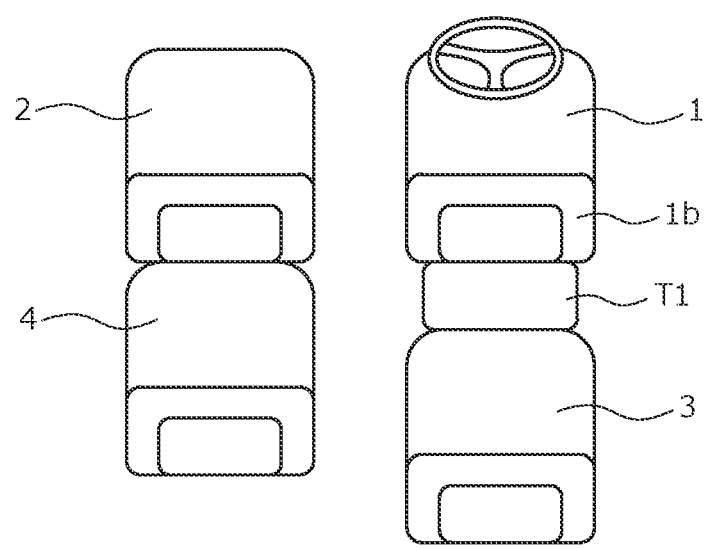
FIG. 13 is a top, schematic drawing showing a state where a table provided at a seat back of a driver seat is pulled out.

Moreover, as shown in FIG. 13 and mentioned above, if the table T1 of the right rear seat 3 as the rear seat is mounted to the seat back 1b of the driver seat 1, the size of the table T1 capable of projecting is limited to the size of the seat back 1b. Therefore, the table T1 was sometimes difficult to use because it was separated too far from the sitting person leaning on the right rear seat 3. As shown in FIG. 5, the table T projects to the right rear seat 3 side in a state that the left rear seat 4 according to the present embodiment is brought close to the passenger seat 2, whereby the above problem is solved.

Specifically, the left rear seat 4 includes, on the side, the armrest 4g in which the folding table T projecting to the right rear seat 3 side is stored. By arranging the left rear seat 4 on the passenger seat 2 side so that the position where the table T projects is in front of the front surface of a seat back 3b by a predetermined distance, the position of the table T can be brought close to the sitting person H on the right rear seat 3 to come close to each other.

In this way, if the table 1 is made to project from the seat in the other row of right and left, the table 1 comes close to the sitting person H and can be made easy to use. Moreover, for example, the table T is provided at the right rear seat 3, and the right rear seat 3 is arranged on the driver seat 1 side, thereafter the table T is made to project to the left rear seat 4 side from the right rear seat 3, and the table T may be used for the sitting person H on the left rear seat 4. Further, the table T is provided at the passenger seat 2, and the passenger seat 2 is arranged on the left rear seat 4 side, thereafter the table T is made to project to the right rear seat 3 side from the passenger seat 2, and the table T may be used for the sitting person H on the right rear seat 3.

In addition, if a cup holder (not shown) is mounted to the armrest 4g, in a case where the cup holder 4g is used with the table T at meals, compared to the cup holder mounted on the door side, the food placed on the table T and the drink held in the cup holder can be arranged closely, and therefore convenience thereof can be increased. Further, since the table T is mounted to the armrest 4g, the table T is not necessary to mount to a center console (not shown), and the center console can be detached from the left rear seat 4 moving back and forth and fixed to the floor (not shown). The fact that the center console can be fixed to the floor in this way is preferable from the viewpoint of stable supply of electricity to a refrigerator when the center console includes the refrigerator.

Moreover, as shown in FIG. 6, in a state that the left rear seat 4 is brought close to the passenger seat 2 side, the seat back 4x as another seat back in the left rear seat 4 may be configured to be rotatable to the right rear seat 3 side.

Such a configuration is not limited to the seat back 4x of the left rear seat 4, the seat back 3b of the right rear seat 3 may be inclined to the left rear seat 4 side when brought close to the driver seat 1, and the seat back 2b of the passenger seat 2 may be rotated to the driver seat 1 side when brought close to the left rear seat 4. In this way, the sitting persons H in the right and left rows are able to easily communicate, and assisting, caring and the like for one sitting person H are facilitated.

In addition, a means for facilitating assisting, caring and the like of the sitting persons H in the right and left rows is not limited to the above configuration, and, for example, as shown in FIG. 7, an edge portion 4h as an edge portion bulging in front of the seat back 4y of the left rear seat 4 may be formed to be easily hollowed (to be compressively deformable) than other portions.

As thus described, by forming the edge portion 4h to be easily hollowed, the upper half of the body of the sitting person H can be leaned forward on the right rear seat 3 side or twisted to face the right rear seat 3 side in such a manner that the edge portion 4h is compressed. Therefore, in a case where the sitting persons H are in the right rear seat 3 and the left rear seat 4 respectively, the sitting person H on one of the right rear seat 3 or the left rear seat 4 easily assists and cares for the sitting person H on the other seat. In addition, for the passenger seat 2 or the right rear seat 3, and further for the edge portion of the driver seat 1, a low-strength material easy to compress may be used. Then, one or both of the configuration in which the seat back 4x is made to be rotatable and the configuration in which the edge portion 4h is made to be easily hollowed may be adopted to any seat.

Moreover, as shown in FIG. 8, the supply openings 6 of the air-conditioner may be provided in the shoulder on the left side of the seat back 1b of the driver seat 1 and in the shoulder on the right side of the seat back 4b of the left rear seat 4. In this way, when the left rear seat 4 is arranged on the passenger seat 2 side, the air flow from the supply opening 6 provided in the shoulder of the seat back 1b of the driver seat 1 can be directed to the left rear seat 4 side. Further, in this arrangement, the air flow from the supply opening 6 provided in the shoulder of the seat back 4b of the left rear seat 4 can be directed to the right rear seat 3 side. Therefore, deviation in temperature control in the vicinity of each of the driver seat 1, the passenger seat 2, the right rear seat 3, and the left rear seat 4 can be suppressed.

First Modified Example

Figure 9A:
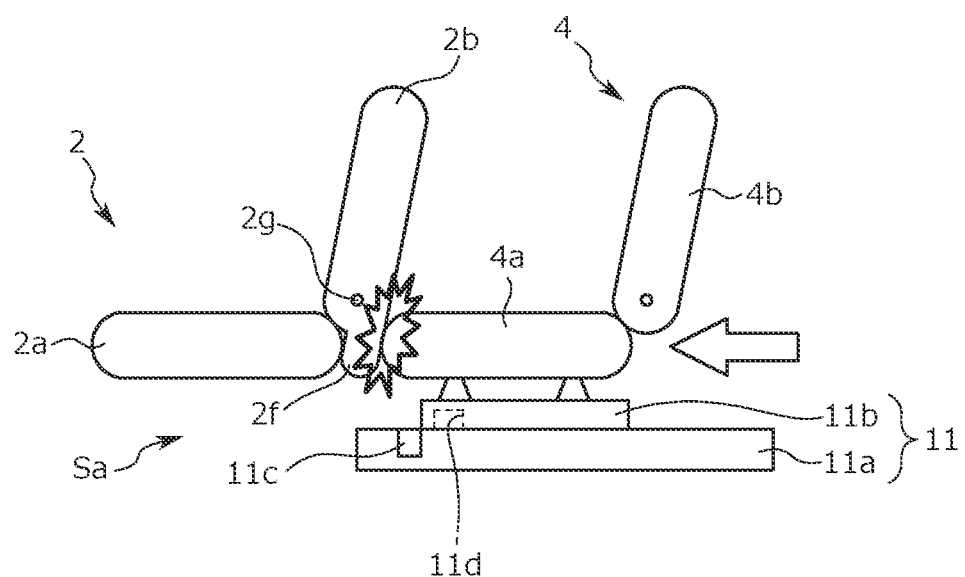
FIG. 9A is a side, schematic diagram showing, in a first modified example, a state that the left rear seat is brought close to the passenger seat in a configuration where the seat back of the passenger seat is raised up.
Figure 9B:
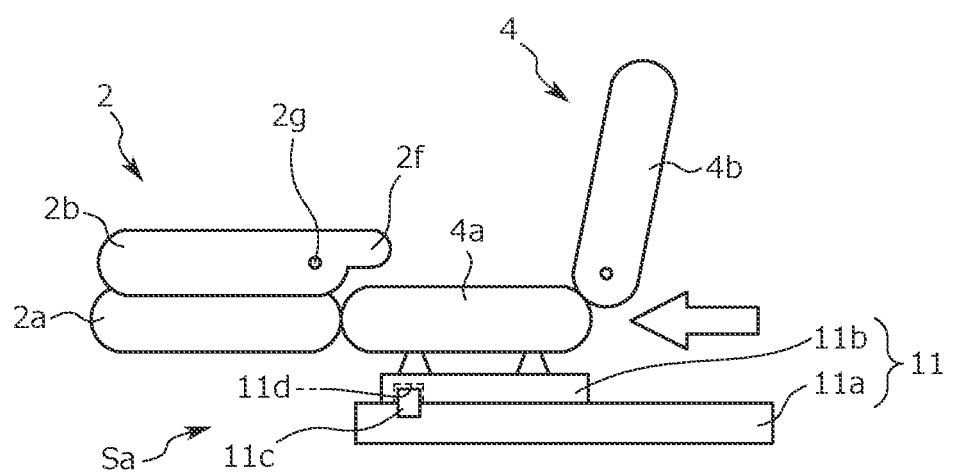
FIG. 9B is a side, schematic diagram showing, in the first modified example, a state that the left rear seat is brought close to the passenger seat in a configuration where the seat back of the passenger seat is lowered.

With reference to FIG. 9, a movement adjustment system Sa according to a first modified example for mechanically performing adjustment of the seat position is described. Here, FIG. 9A is a side, schematic diagram showing a state that the left rear seat 4 is brought close to the passenger seat 2 in a configuration where the seat back 2 of the passenger seat 2 is raised up, and FIG. 9B is a side, schematic diagram showing a state that the left rear seat 4 is brought close to the passenger seat 2 in a configuration where the seat back 2b of the passenger seat 2 is lowered. It should be noted that, in the description below, the members having the same shape and structure are referred to by the same reference numerals, a description thereof is omitted, and the differences from the members having different shapes and structures are clarified.

As shown in FIG. 9A, the seat back 2b has a rotary shaft 2g which is the center of rotation when the seat back 2b is switched between the lowered state and the upright state, and is formed with an extension part 2f that extends downwardly further than the rotary shaft 2g in the upright state of the seat back 2b. Moreover, in the lower portion of the seat cushion 4a, the slide rail 11 is mounted.

The lock groove 11d is formed in a position facing the lock member 11c in a state that the seat cushion 2a of the passenger seat 2 and the seat cushion 4a of the left rear seat 4 are abutted.

The extension part 2f corresponds to one of the movement region change part according to the present disclosure, and as shown in FIG. 9A, is provided in the lower portion of the rotary shaft 2g and in front of the seat cushion 4a in a case where the seat back 2b is in the upright state. Moreover, by the rotation of the seat back 2b around the rotary shaft 2g, as shown in FIG. 9B, in a case where the seat back 2b is in the lowered state, the extension part 2f is moved to a position which is in the upper portion of the rotary shaft 2g and does not interfere with a front of the seat cushion 4a.

Therefore, in a case where the seat back 2b is in the upright state, the extension part 2f limits the forward movement of the left rear seat 4 by abutting the seat cushion 4a of the left rear seat 4. On the other hand, in a case where the seat back 2b is in the lowered state, the extension part 2f is in a position above the seat cushion 4a of the left rear seat 4, and permits the further forward movement of the left rear seat 4 by not interfering with the movement.

Then, in a case the seat back 2b is in the lowered state, when the seat cushion 4a abuts the passenger seat 2, the lock groove 11d is in a position facing the lock member 11c. Therefore, by locking the lock member 11c in the lock groove 11d and fixing the position of the left rear seat 4, the passenger seat 2 can be suitably used as an ottoman.

The extension part 2f may be in a position capable of abutting on the seat cushion 4a in the upright state of the seat back 2b, and may be formed at at least a part of the seat width direction. By such a configuration, while enabling the sitting person H on the left rear seat 4 to put his feet through between the passenger seat 2 and the left rear seat 4 in the portion not formed with the extension part 2f, the forward movement of the left rear seat 4 can be limited.

Second Modified Example

Figure 10A:
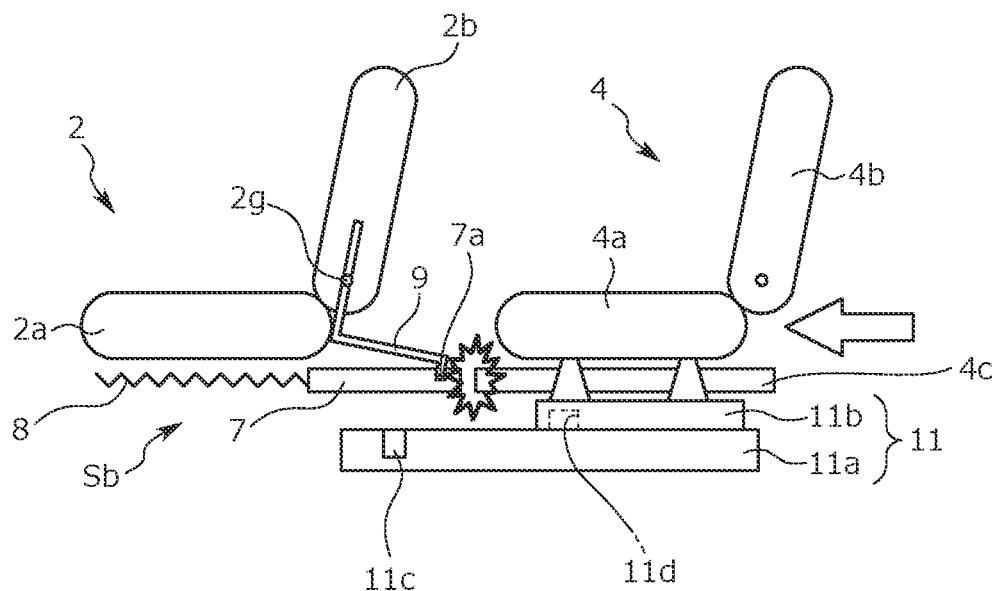
FIG. 10A is a side, schematic diagram showing, in a second modified example, a state that the left rear seat is brought close to the passenger seat in a configuration where the seat back of the passenger seat is raised up.
Figure 10B:
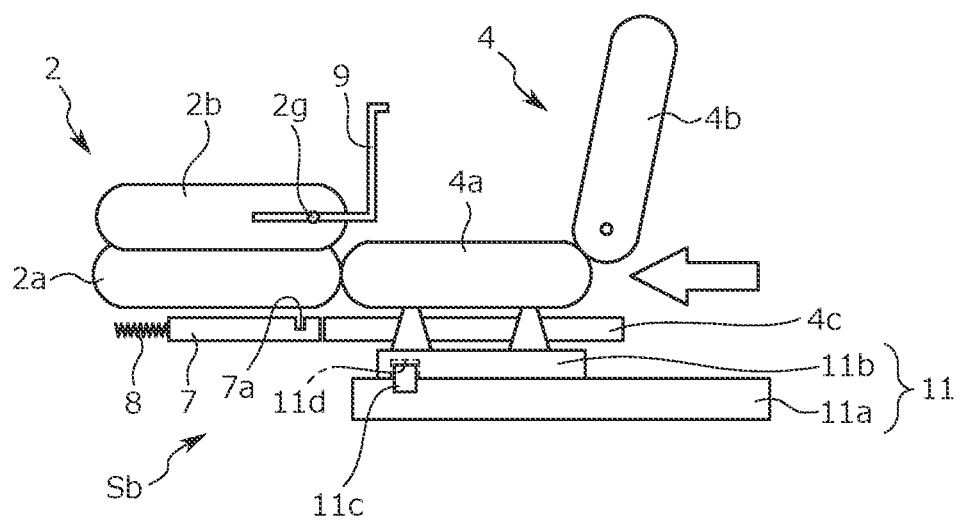
FIG. 10B is a side, schematic diagram showing, in the second modified example, a state that the left rear seat is brought close to the passenger seat in a state that the seat back of the passenger seat is lowered.

In the movement adjustment system Sa according to the first modified example, the slidable positions of the left rear seat 4 in the upright state and the lowered state of the seat back 2b are changed by the extension part 2f, but the present disclosure is not limited to such a configuration. With reference to FIG. 10, a movement adjustment system Sb according to a second modified example for mechanically performing adjustment of the seat position is described. FIG. 10A is a side, schematic diagram showing a state that the left rear seat 4 is brought close to the passenger seat 2 in a configuration where the seat back 2b of the passenger 2 seat is raised up, and FIG. 10B is a side, schematic diagram showing a state that the left rear seat 4 is brought close to the passenger seat 2 in a configuration where the seat back 2b of the passenger seat 2 is lowered.

The movement adjustment system Sb according to the present example is characterized by including a front rod 7 provided in the lower portion of the seat cushion 2a, a compression spring 8 for biasing the front rod 7 to the rear of the vehicle, a rear rod 4c, and a stopper 9 mounted to the seat back 2b.

The front rod 7 is arranged to extend in the front to back direction on a straight line in front of the rear rod 4c, and is biased to the rear of the vehicle by the compression spring 8. In particular, in the top surface on the rear side of the front rod 7, a locking groove 7a locked with the stopper 9 (described below) is formed. The stopper 9 corresponds to one of the movement region change part according to the present disclosure, is made of a substantially S-shaped bar, and is mounted to the outside of the seat back 2b in the seat width direction. In the upright state of the seat back 2b, the stopper 9 is arranged to be lockable to the locking groove 7a formed in the front rod 7.

The operation of the movement adjustment system Sb according to the above configuration is now described. As shown in FIG. 10A, when the seat back 2b is in the upright state, the stopper 9 fixes the position of the front rod 7 located in the rear thereof by being locked in the locking groove 7a. Thereby, the movement of the left rear seat 4 fixed to the rear rod 4c is limited to a position where the rear rod 4c abuts the front rod 7, and the clearance between the passenger seat 2 and the left rear seat 4 is kept to the clearance in which the sitting person H can put his feet.

On the other hand, as shown in FIG. 10B, when the seat back 2b is in the lowered state, the stopper 9 also rotates around the rotary shaft 2g in association with the rotation of the seat back 2b around the rotary shaft 2g from the upright state to the lowered state. Thereby, locking of the stopper 9 into the locking groove 7a is released, and the front rod 7 can be moved back and forth. Further, a force against the bias of the compression spring 8 in a state that the rear rod 4c abuts the front rod 7 is applied to the left rear seat 4, thereby the left rear seat 4 can be moved forwardly to a position where it abuts the passenger seat 2. Then, when the seat cushion 4a abuts the passenger seat 2, the lock groove 11d is in a position facing the lock member 11c. Therefore, the position of the left rear seat 4 is fixed by locking the lock member 11c in the lock groove 11d, thereby the passenger seat 2 can be suitably used as an ottoman.

According to the configuration according to the present example, when the seat back 2b is in the upright state, a space for putting one's feet in can be secured between the passenger seat 2 and the left rear seat 4 by the stopper 9.

It should be noted that, FIG. 10 is an image view for facilitating the understanding, and in this figure, the stopper 9 is shown to be arranged at the height same as or higher than the seat cushion 2a, but in other embodiments, is arranged in the lower portion of the seat cushion 2a.

Third Modified Example

Figure 11A:
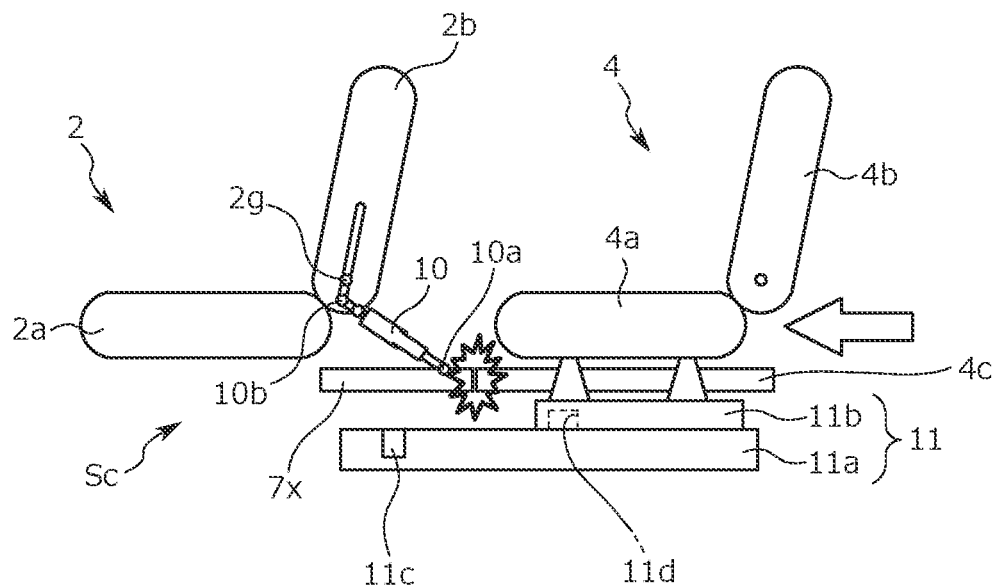
FIG. 11A is a side, schematic diagram showing, in a third modified example, a state that the left rear seat is brought close to the passenger seat in a configuration where the seat back of the passenger seat is raised up.
Figure 11B:
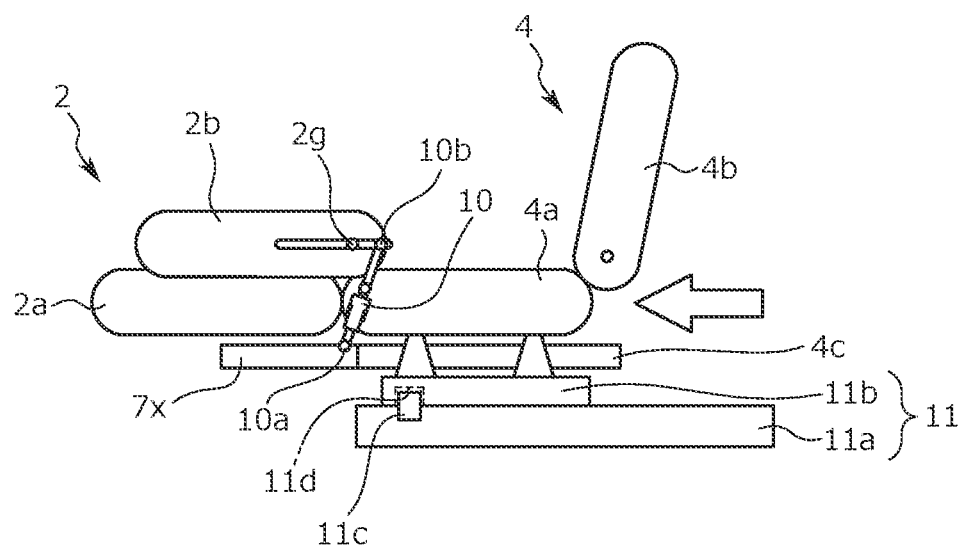
FIG. 11B is a side, schematic diagram showing, in the third modified example, a state that the left rear seat is brought close to the passenger seat in a configuration where the seat back of the passenger seat is lowered.

With reference to FIG. 11, a movement adjustment system Sc according to a third modified example for mechanically performing adjustment of the seat position is described. FIG. 11A is a side, schematic diagram showing a state that the left rear seat 4 is brought close to the passenger seat 2 in a configuration where the seat back 2b of the passenger seat 2 is raised up, and FIG. 11B is a side, schematic diagram showing a state that the left rear seat 4 is brought close to the passenger seat 2 in a configuration where the seat back 2b of the passenger seat 2 is lowered.

The movement adjustment system Sc according to the present example includes a front rod 7x provided in the lower portion of the seat cushion 2a, the rear rod 4c, and a link 10 mounted to the seat cushion 2a.

The front rod 7x is arranged to extend in the front to back direction on a straight line in front of the rear rod 4c. In particular, on the rear side of the front rod 7x, a lower end portion 10a of the link 10 (described below) is connected.

The link 10 corresponds to one of the movement region change part according to the present disclosure, and the lower end portion 10a thereof and the upper end portion 10b thereof are mounted rotatably to the rear side of the front rod 7x and the lower side of the seat back 2b, respectively. Moreover, as shown in FIG. 11A, when the seat back 2b is in the upright state, the link 10 is mounted at an upper end portion 10b thereof in a portion of the seat back 2b that is lower than the rotary shaft 2g, and is arranged to extend obliquely forward from the lower end portion 10a to the upper end portion 10b. Then, the seat back 2b is changed from the upright state to the lowered state shown in FIG. 11B, and along with this, the upper end portion 10b is moved to be located along a horizontal plane of the rotary shaft 2g of the seat back 2b, and the lower end portion 10a is moved forwardly.

As described above, depending on the state of the seat back 2b, the position of the lower end portion 10a is changed, and along with this, the position of the front rod 7x connected to the lower end portion 10a is changed. That is, when the seat back 2b is in the upright state shown in FIG. 11A, the upper end portion 10b is in the lower position, and therefore, the lower end portion 10a of the link 10 projects backwardly, and the front rod 7x is moved backwardly. Therefore, the sliding range of the left rear seat 4 is limited to a position where the rear rod 4c abuts the front rod 7x moved backwardly. On the other hand, when the seat back 2b is in the lowered state shown in FIG. 11B, the upper end portion 10b is in the upper position, and therefore, the lower end portion 10a of the link 10 is pulled forwardly, and the front rod 7x is moved forwardly. Therefore, the sliding range of the left rear seat 4 is expanded forwardly to a position where the rear rod 4c abuts the front rod 7x moved forwardly.

According to the configuration according to the present example, when the seat back 2b is in the upright state, a space for putting one's feet in can be secured between the passenger seat 2 and the left rear seat 4 by the link 10. Moreover, even without using the compression spring 8, the front rod 7x can be moved back and forth, and therefore, the number of parts can be reduced, and in the lowered state of the passenger seat 2, a force against the biasing force of the compression spring 8 is not required when moving the left rear seat 4.

It should be noted that, FIG. 11 is an image view for facilitating the understanding, and in this figure, the link 10 is shown to be arranged at a same height as or higher than the seat cushion 2a, but in other embodiments, is arranged in the lower portion of the seat cushion 2a.

In the above embodiments, although the right rear seat 3 and the left rear seat 4 are described as being separately formed, the present disclosure may be applied to a bench type seat in which both seats are integrally formed. Moreover, in the above embodiments, although the configuration for sliding the left rear seat 4 is described when explaining the relationship between the passenger seat 2 and the left rear seat 4 which come close to each other or are separated from one another, the present disclosure is not limited to such a configuration as long as the clearance between the front and rear seats can be adjusted. For example, another embodiment provides a configuration for sliding the passenger seat 2 instead of the left rear seat 4.

Moreover, by having a square cross-section, the lock member 11c is preferable because it can limit the movement by coming into surface contact with the upper rail 11b. However, the lock member 11c is not limited to such a shape as long as it can limit the movement of the upper rail 11b.

Further, when a signal is received, indicating that the presence or the absence of the sitting person on the front seat has been detected by a proximity sensor, a camera or the like (not shown) (e.g., by another detection part), the control part C may, for example, limit the sliding amount (change the movement region) of the rear seat. More specifically, the control part C may change the movement region of the rear seat so that the rear seat can be moved to a position close to the front seat when the sitting person is absent than when the sitting person is present.

Further, although the seats in two rows of front and rear are described, the present disclosure can be applied to a vehicle having seats in three rows of front and rear, for example, as long as it can adjust the front and rear clearance of the seats.

TABLE OF REFERENCE NUMERALS

1: Driver seat (Conveyance seat)
1b: Seat back
2: Passenger seat (Front seat, Conveyance seat)
2a: Seat Cushion
2b: Seat back
2d: Cushion part
2e: Side frame
2f: Extension part (Movement region change part)
2g: Rotary shaft
2h: footrest portion
2ha: upper end portion of footrest portion
2hb: front portion of footrest portion
2hc: rear portion of footrest portion
2s: Fall-down sensor (Detection part)
3: Right rear seat (Conveyance seat)
3b: Seat back
4: Left rear seat (Rear seat, Conveyance seat)
4a: Seat cushion
4b: Seat back 4c: Rear rod
4g: Armrest
4h: Edge portion (edge portion)
4x, 4y: Seat back (Another seat back)
6: Supply opening
7, 7x: Front rod
7a: Locking groove (Movement region change part)
8: Compression spring
9: Stopper (Movement region change part)
10: Link (Movement region change part)
10a: Lower end portion
10b: Upper end portion
11: Slide rail (Moving mechanism)
11a: Lower rail
11b: Upper rail
11c: Lock member (Movement region change part)
11d: Lock groove
20: Belt buckle
C; Control part (Movement region change part)
Ca, C1a: Vehicle
H: Sitting person (Occupant)
Ha: Adult
Hb: Child
S, Sa, Sb, Sc: Movement adjustment system
T, T1: Table

What is claimed is:

1. A movement adjustment system used for conveyance seats, comprising:
   conveyance seats that include a front seat and a rear seat;
   a moving mechanism configured to move at least one of the front seat and the rear seat in a front to back direction; and
   a movement region change part configured to change a movement region of the at least one of the front seat and the rear seat moved by the moving mechanism, wherein
   the front seat has a seat cushion, and a seat back mounted to be changeable between an upright state and a lowered state with respect to the seat cushion,
   the seat back of the front seat is provided with a footrest portion on which feet of a sitting person on the rear seat can be put, and
   the movement region change part is configured to change the movement region so that the sitting person on the rear seat can put the feet on the footrest portion when the seat back of the front seat is in the lowered state.

2. The movement adjustment system according to claim 1, wherein an upper end portion of the footrest portion is positioned at a higher position than a seat cushion of the rear seat.

3. The movement adjustment system according to claim 1, wherein the footrest portion is sloped so that a front portion of the footrest portion is at a lower position than a rear portion of the footrest portion.

4. The movement adjustment system according to claim 1, further comprising a detector configured to detect the lowered state and the upright state of the seat back of the front seat, wherein
   the movement region change part:
      determines the lowered state and the upright state of the seat back based on the signal obtained from the detector, and
      when the seat back is in the lowered state, changes the movement region so that the front seat and the rear seat can be moved to positions closer to each other than when the seat back is in the upright state.

5. The movement adjustment system according to claim 4, wherein the detector comprises a proximity sensor and is mounted to the seat back of the front seat, and
   wherein the proximity sensor is configured to detect that the seat back is lowered and is close to the seat cushion.

6. The movement adjustment system according to claim 4, wherein an upper end portion of the footrest portion is positioned at a higher position than a seat cushion of the rear seat.

7. The movement adjustment system according to claim 4, wherein the footrest portion is sloped so that a front portion of the footrest portion is at a lower position than a rear portion of the footrest portion.

8. The movement adjustment system according to claim 1, wherein the rear seat includes a seat cushion and a seat back mounted to a rear end of the seat cushion,
   wherein the moving mechanism includes a slide rail, and
   wherein the seat cushion of the at least one of the front seat and the rear seat is mounted on the slide rail to move in the front to back direction.

9. The movement adjustment system according to claim 8, wherein the movement region change part is provided on the slide rail.

10. The movement adjustment system according to claim 9, wherein the slide rail includes a lower rail that is fixed to a floor of a conveyance and extends in the front to back direction, and an upper rail that is mounted to be slidable back and forth with respect to the lower rail, and
    wherein the movement region change part is a lock member that is provided on the lower member and protrudes from the lower member.

11. The movement adjustment system according to claim 8, wherein an upper end portion of the footrest portion is positioned at a higher position than the seat cushion of the rear seat.

12. The movement adjustment system according to claim 8, wherein the footrest portion is sloped so that a front portion of the footrest portion is at a lower position than a rear portion of the footrest portion.

13. The movement adjustment system according to claim 8, further comprising a detector configured to detect the lowered state and the upright state of the seat back of the front seat, wherein
    the movement region change part:
       determines the lowered state and the upright state of the seat back based on the signal obtained from the detector, and
       when the seat back is in the lowered state, changes the movement region so that the front seat and the rear seat can be moved to positions closer to each other than when the seat back is in the upright state.

14. The movement adjustment system according to claim 13, wherein an upper end portion of the footrest portion is positioned at a higher position than the seat cushion of the rear seat.

15. The movement adjustment system according to claim 13, wherein the footrest portion is sloped so that a front portion of the footrest portion is at a lower position than a rear portion of the footrest portion.

* * * * *